United States Patent Office 2,948,513
Patented Aug. 9, 1960

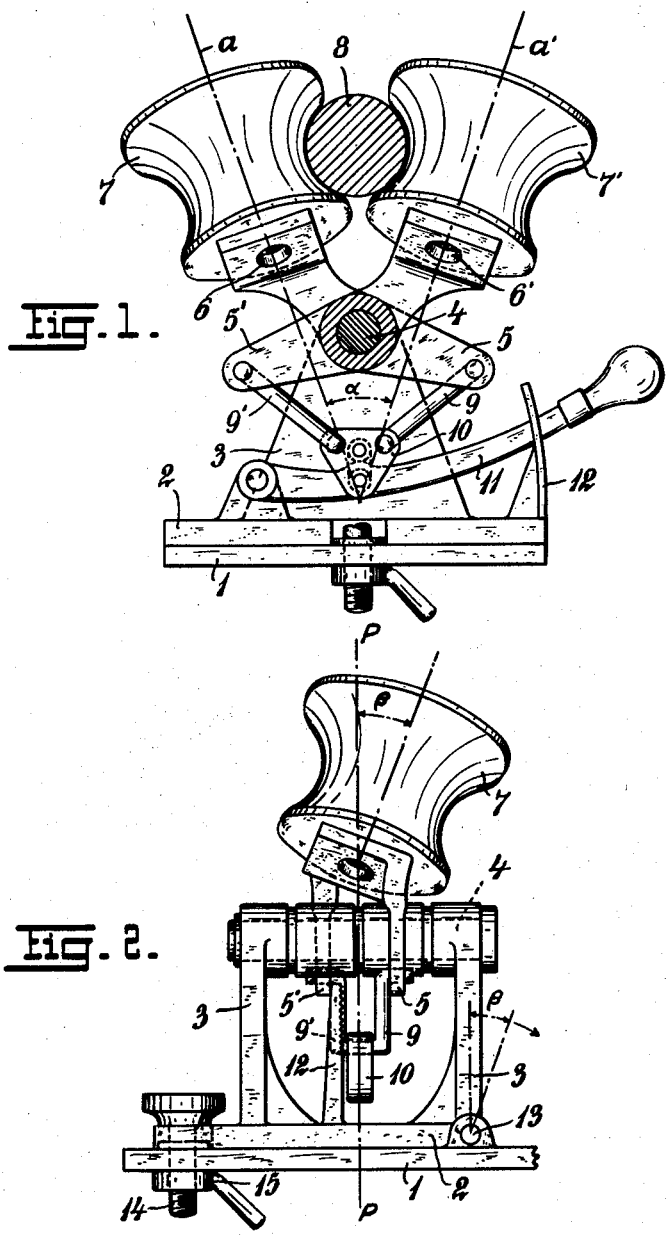

2,948,513

GUIDE ROLLER DEVICE

Danckert Krohn-Holm, Oscarsgate 13, Oslo, Norway

Filed Oct. 27, 1958, Ser. No. 769,827

Claims priority, application Norway Nov. 7, 1957

4 Claims. (Cl. 254—190)

The present invention relates to a guide roller arrangement and more particularly relates to a guide roller device for the support and guidance of such objects as cables, pipes, ropes or similar elements having a circular cross section.

It is known to arrange guide rollers in cooperating pairs, with the axes of rotation of the rollers forming a mutual angle that is located in a plane normal to the cable or the like.

It is the object of the invention to provide a guide roller device, wherein the guide roller groove engages the cable or the like along a tangent curve of circular form, and extending over a substantial part of the circumference of the cable.

It is a further object of the invention to provide a device of the above mentioned kind, which is adjustable over a wide range for different dimensions of the cable, pipe, rope or the like and which device will encircle a substantial part of the circumference of the cable, pipe, rope or the like element.

It is a further object of the invention to provide a device of the above mentioned kind, which has a simple and compact structure and which is easy to adjust for different cable sizes.

According to the present invention, the above objects are obtained by disposing a pair of guide rollers in side by side relationship, with each roller having a guiding groove that is of elliptical form in cross section, the rollers being arranged in complementary relationship and having axes of rotation forming an adjustable angle, the bisector of the angle extending through the center line of the cable with the pair of rollers being tiltably arranged in relation to a plane perpendicular to the cable, the tilting angle being adjustable about an axis transverse to the cable.

To have a better understanding of the present invention it will be described in more detail below in connection with the drawings, where an embodiment of the invention is schematically shown. It shall, however, be pointed out, that the embodiment shown only is meant as an example to illustrate how the invention may be carried out in practice, and that the invention in no way is limited thereto.

Fig. 1 is a side elevational view of the device according to the invention, seen and taken in the direction of the center line of the cable, and Fig. 2 is an elevational view taken normal to the elevation of Fig. 1.

In the drawings 1 designates a stationary bed plate, to which a base plate 2 is hingedly connected by means of the hinge pivot 13. The base plate 2 is formed with two upstanding brackets 3, the free ends of which provide journals for a shaft 4. Two levers 5, 5' are rotatably mounted on the shaft 4 and at the upper free ends of said levers, as at 6, 6', two guide rollers 7, 7' are rotatably journaled. The rollers 7, 7' are formed with grooves which in cross section have an elliptical form. The lower ends of the levers 5, 5' are connected by rods 9, 9' and a connecting element 10, to an adjustment lever 11. From one edge of the base plate 2, a toothed bar or plate 12 upstands. As clearly seen from Fig. 2, the teeth of the bar or plate 12 cooperate with a tooth on the adjustment lever 11 to lock the lever 11 in various positions of adjustment and thereby secure the rollers 7, 7' in various positions relative to each other and to the cable.

When moving the lever 11 up or down, the angle $\alpha$ between the axes $a$, $a'$ of rotation of the rollers 7, 7' may be adjusted according to desire. Thereby the pair of guide rollers may be adjusted for different cable 8 dimensions.

As above stated, the form of the guide roller groove is elliptical. To achieve the result that the guide roller pair always engages the cable along a circular tangent curve, it is, however, necessary also to be able to adjust the position of the rollers 7, 7' by tilting them on angle $\beta$. Thereby it is always possible to adjust the angle $\alpha$, between the roller axes as well as the angle $\beta$ i.e. the tilting angle of the roller pair in relation to the cable axis.

The arrangement, whereby the last mentioned adjustment is obtained, is clearly seen from Fig. 2. The bed plate 1 is provided with the journaling means 13, for the base plate 2, and at the other end the plates are provided with a screw 14 and locking arrangement 15. Thereby the base plate 2 may be locked at an inclined angle in relation to the stationary bed plate 1, whereby the entire mechanism supporting the rollers 7, 7' and thus also these rollers are tilted at an angle $\beta$.

By suitable adjustment of the two angles $\alpha$, $\beta$, as above defined, the rollers 7 and 7' always may be brought to engage a cable, rope, pipe etc., having circular cross section along a tangent curve. Further the device achieves contact over a substantial part of the circumference of said cable or the like.

The device according to the invention also may be used for the forming of a long body, having circular cross section by passing a formable mass between the pair of rollers.

What I claim is:

1. A guide roller device for the support of a cable or similar elongated element of circular cross section comprising a pair of complementarily arranged rollers, each roller having a guide groove of elliptical form in cross section, said rollers being arranged in relatively inclined side by side relationship and having axes of rotation forming an adjustable angle, the bisector of which extends perpendicularly through the cable, said rollers being tiltably arranged in relation to a plane perpendicular to the cable and about an axis normal to the axis of the cable.

2. A guide roller device for the support of a cable or similar elongated element of circular cross section comprising a pair of complementarily arranged rollers, each roller having a guide groove of elliptical form in cross section, said rollers being arranged in relatively inclined side by side relationship and having axes of rotation forming an angle, the bisector of which extends perpendicularly through the cable, means supporting the rollers for adjusting said angle and moving the rollers relative to each other transverse to the cable, means for commonly adjusting said rollers in relation to a plane perpendicular to the cable and about an axis transverse to the axis of the cable.

3. A guide roller device as claimed in claim 2, wherein said means supporting the rollers for adjusting said angle include a supporting shaft arranged parallel with the axis of the cable, a pair of levers rotatably mounted on the shaft and having opposing ends, one end of each of the levers supporting a roller, and means connected to the opposing end of each lever for moving the levers in symmetrical movement on the shaft, said last means including an actuating lever and means for locking the lever in adjusted positions.

4. A guide roller device as claimed in claim 3, wherein said shaft is mounted on a supporting plate and said means for commonly adjusting said rollers comprises a fixed plate, means for pivotally mounting the supporting plate on the fixed plate and means for locking the supporting plate in various angular positions relative to the fixed plate.

References Cited in the file of this patent

UNITED STATES PATENTS

| | | |
|---|---|---|
| 2,738,143 | Hannay | Mar. 13, 1956 |
| 2,783,025 | Scheidt | Feb. 26, 1957 |

FOREIGN PATENTS

| | | |
|---|---|---|
| 61,986 | Switzerland | Nov. 19, 1912 |
| 709,321 | Great Britain | May 19, 1954 |